(12) United States Patent
Beck et al.

(10) Patent No.: US 6,841,262 B1
(45) Date of Patent: Jan. 11, 2005

(54) HAND GRIPPABLE BOTTLE AND PREFORM

(75) Inventors: Martin H. Beck, Amherst, NH (US);
Robert J. Caldicott, Natick, MA (US)

(73) Assignee: DTL Technology Limited Partnership, Amherst, NH (US)

( * ) Notice: Subject to any disclaimer, the term of this patent is extended or adjusted under 35 U.S.C. 154(b) by 0 days.

(21) Appl. No.: 10/181,123

(22) PCT Filed: Oct. 19, 2000

(86) PCT No.: PCT/US00/41302
§ 371 (c)(1), (2), (4) Date: Jul. 11, 2002

(87) PCT Pub. No.: WO01/56896
PCT Pub. Date: Aug. 9, 2001

Related U.S. Application Data
(60) Provisional application No. 60/179,937, filed on Feb. 3, 2000.

(51) Int. Cl.$^7$ .............................. B29B 7/00; B65D 6/10; B65D 90/02
(52) U.S. Cl. ................. 428/542.8; 428/35.7; 428/36.9; 428/36.91; 220/669; 220/675; 215/382; 215/383; 215/384
(58) Field of Search ............................... 428/35.2, 35.7, 428/36.9, 36.91, 36.92, 592.8, 524, 480, 212, 213, 215, 216, 22 D, 542.8; 220/669, 675, 670, 671, 672, 673, 674; 215/382, 383, 384

(56) References Cited

U.S. PATENT DOCUMENTS

| | | | |
|---|---|---|---|
| 4,892,205 A | * 1/1990 | Powers et al. ................. 215/1 |
| 4,927,679 A | 5/1990 | Beck | |
| 4,950,514 A | * 8/1990 | Strassheimer ............ 428/36.92 |
| 4,954,376 A | 9/1990 | Krishnakumar et al. | |
| 5,066,528 A | * 11/1991 | Krishnakumar et al. . 428/36.92 |
| 5,104,706 A | 4/1992 | Krishnakumar et al. | |
| 5,261,543 A | 11/1993 | Ugarelli | |
| 5,392,937 A | 2/1995 | Prevot et al. | |
| 5,614,148 A | * 3/1997 | Beck et al. ................. 264/532 |
| 5,803,290 A | 9/1998 | Bongiorno | |
| 5,888,598 A | 3/1999 | Brewster et al. | |
| 6,555,191 B1 | * 4/2003 | Smith et al. ............. 428/36.92 |

* cited by examiner

Primary Examiner—Harold Pyon
Assistant Examiner—Michael C. Miggins
(74) Attorney, Agent, or Firm—Davis & Bujold, P.L.L.C.

(57) ABSTRACT

A preform having an annular wall region of increased wall thickness to produce a blow molded container having an annular concavity in a wall portion thereof to provide a hand grip feature, such a container when blow molded from such a preform and a carbonated beverage container having intaglio hand grip wall hand grip features.

3 Claims, 6 Drawing Sheets

GRIP

FIG.1

CONTOUR

HAND GRIPPABLE BOTTLE AND PREFORM

This application claims the benefit of provisional application Ser. No. 60/179,937 filed Feb. 3, 2000.

This patent application relates to preform designs for blow molding plastic, e.g. polyethylene terephthalate (PET), containers having hand grip contour features and to containers having such features.

BACKGROUND OF THE INVENTION

In the past, different designs have been used to make a bottle meet specifications. The typical failure for a bottle is in the grip area or deep contour which will expand (creep) upon pressurization (carbonation) and/or higher than room temperatures. Typical bottle tests call for PET bottles to be pressurized to 4.0 volumes of $CO_2$ (~55 psi at room temperature) and then placed in an oven for 24 hours at 100° F. At this temperature, the gas pressure rises to ~95 psi. In addition to the higher forces applied to the plastic walls, the elastic modulus of the plastic is also slightly lower due to the higher temperature. Due to geometry, the bottles will creep in such a way distorting to the point of eliminating any grip or contour design elements in the sidewall of the bottle.

Some geometric designs will resist the creep and try to retain their original shape, but generally a good percentage of the shape is lost. U.S. Pat. No. 5,803,290 shows one design that claims to hold a significant portion of the shape.

SUMMARY OF THE INVENTION

The present invention is directed to making a hand grip or contour feature perform in a large size container, and particularly to such a container for carbonated beverages, where a normal hand cannot grip the bottle with one hand and a prior art contour will not normally remain visible under pressurized conditions. In addition, the invention increases the strength of the hand grip due to an increase in preform wall thickness even non-pressurized containers, such as liquor bottles or hot-fill containers. The work that we have done indicates two new technologies. The first is the preform design and the second is the bottle design features that enhance the "gripability" and the retention of "contour shape" of the bottle.

To make the bottle meet specifications, we place a ring of material around the Pinch Grip or Contour Feature of the bottle. To accomplish that, the preform design is unique in that a ring of material is placed in approximately the middle of the preform so that upon stretching the thicker ring of material is located within the Pinch Grip area of the bottle or, in the case of a contour, in the inner contour geometry.

BRIEF DESCRIPTION OF THE DRAWINGS

The present invention will now be described, by way of example, with reference to the accompanying drawings, in which.

DESCRIPTION OF THE PREFERRED EMBODIMENTS

Reinforcing rings in preforms have been proposed in U.S. Pat. Nos. 4,927,679 and 5,614,148. These reinforcing rings are located in the base area of the preform (see FIGS. 6 and 7) and may be combined with the thickened panel sidewalls of the present invention, shown above in FIGS. 3A–3D and in the combination, referred to above, in FIG. 5.

Figure 1:
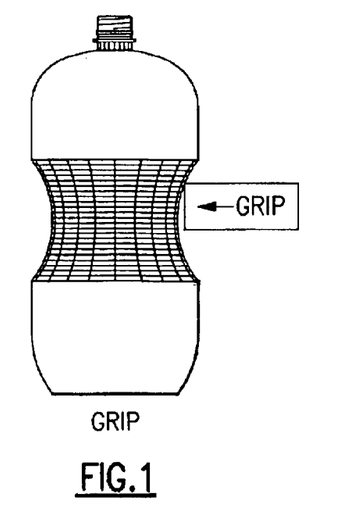
FIG. 1 is a side elevation of a container for carbonated beverages having a waisted contour feature.
Figure 2:
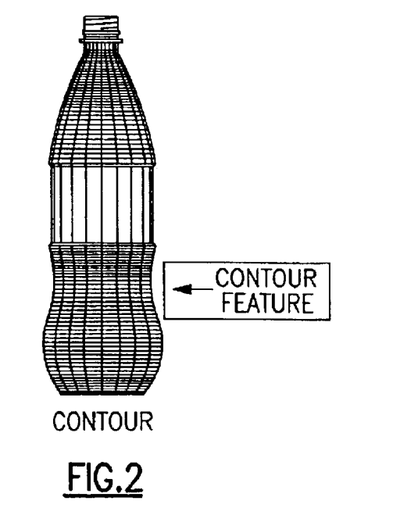
FIG. 2 is a side elevation of a container similar to that of FIG. 1 illustrating a waisted contour feature.
Figure 3A:
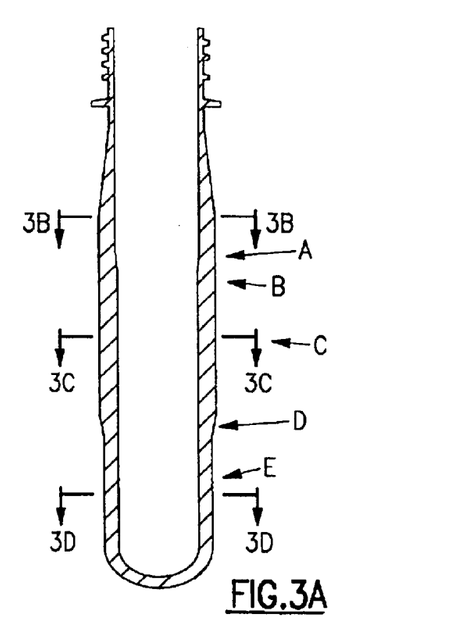
FIG. 3A–D are, respectively, a sectional elevation and three sectional cross-sections shown as 3B–3B, 3C–3C and 3D–3D in FIG. 3A of a preform for blow molding the container of FIG. 1.
Figure 3B:
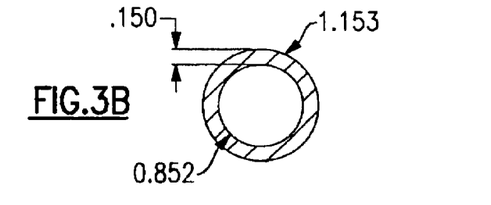
Figure 3C:
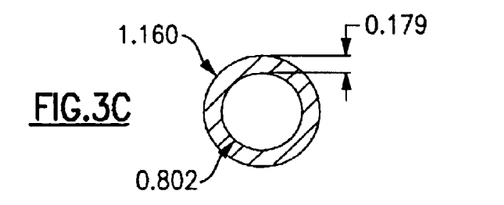
Figure 3D:
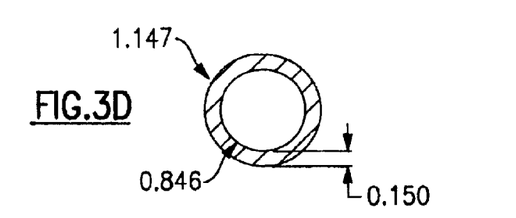
Figure 4:
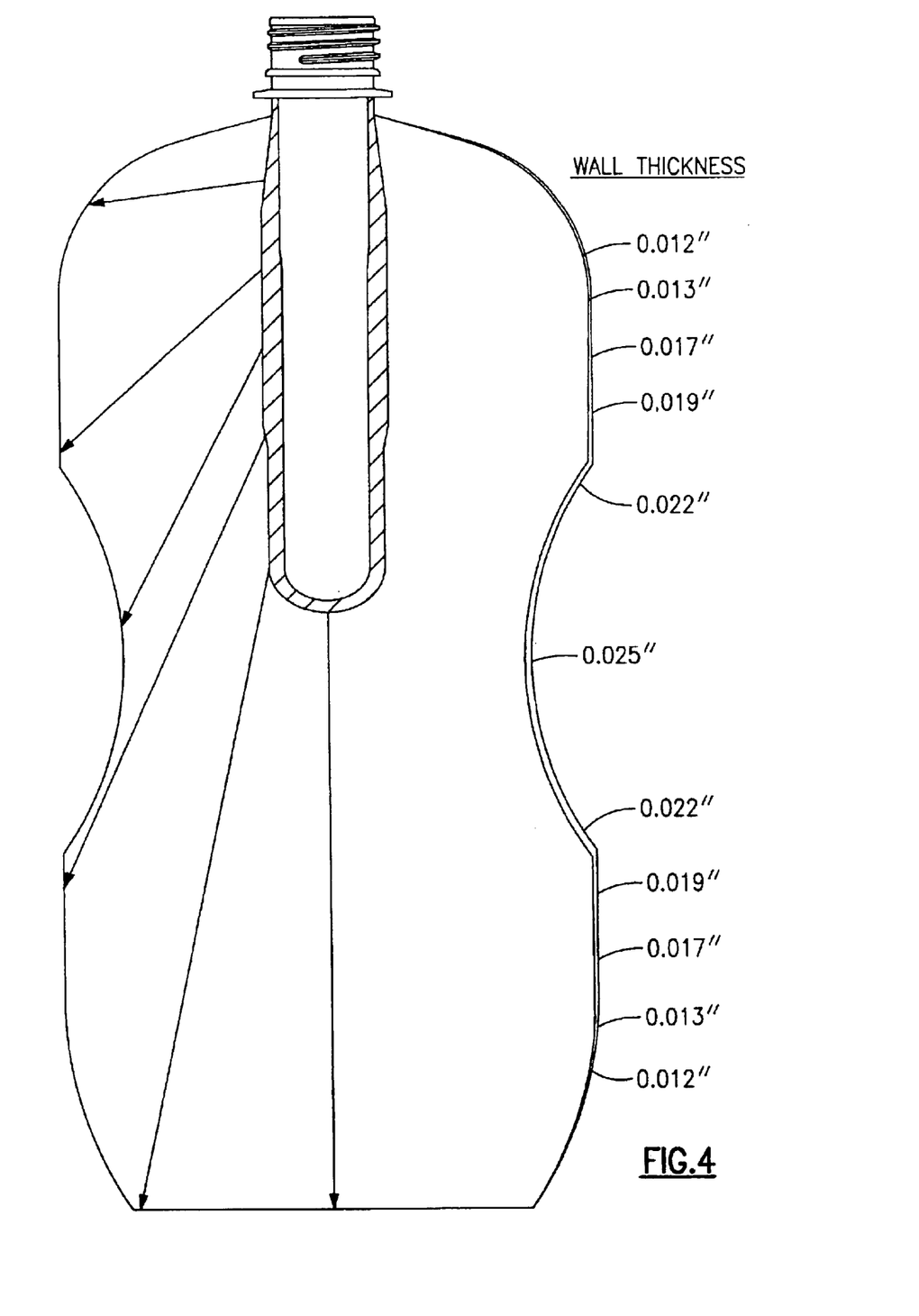
FIG. 4 is a diagrammatic cross-section of the container of FIG. 1 with the preform of FIG. 3A superimposed therein to illustrate typical wall thicknesses of the container and material distribution of the preform during blow molding.
Figure 5:
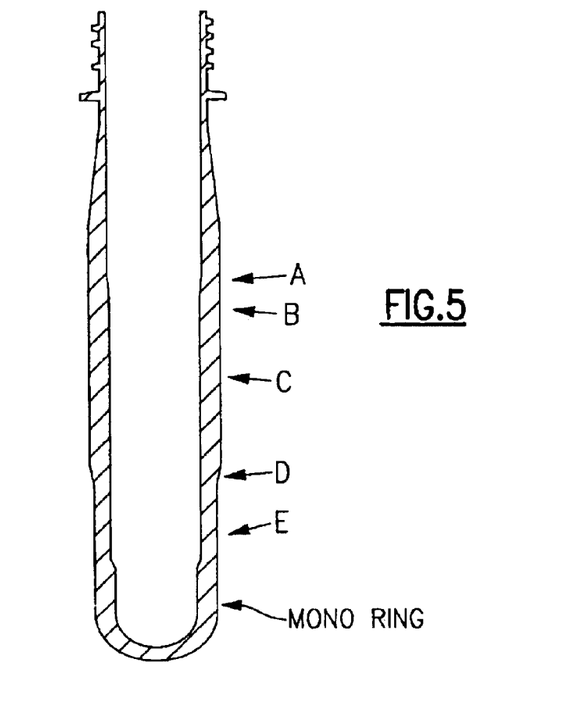
FIG. 5 is a sectional elevation of a preform having the features of the preform of FIG. 3A in combination with a base reinforcing ring.

The preform of the present invention starts (FIG. 3A) from neck, shoulder portion and first wall portion with a normal or usual material thickness, then transitions to a sidewall thickening ring, then transitions back to a normal or usual wall thickness, or slightly greater than this, but in all cases less thick than a base reinforcing ring, if present (FIG. 5).

As can be seen from the drawings (FIGS. 3A and 5), the interior of the preform has to taper inwards in order to remove the preform from typical injection molds. This inward taper means that the lower portions of the preform have to stretch further for a typical design bottle. Because it has to stretch further, the stretch ratios are higher for that section of the preform formed bottle. This is defined as the hoop stretch ratio (HSR). The HSR can be calculated from the OD of the preform wall, the middle (avg) of the preform wall or the ID of the preform wall. Without an increase in the preform wall thickness in this area, the final bottle wall thickness will be less.

One could further add a base reinforcing ring design to this Pinch Grip preform where the wall section of the preform under the first thickening ring is approximately the initial wall thickness which then transitions to a thickening rib which then transitions to a base area thinner than initial wall (see FIG. 5).

Note that the preform walls in the different sections may not be a straight wall but may have slight tapers which yield a non-uniform wall thickness in the vertical direction. In other words, FIG. 5 may have a difference in wall thickness from the top versus bottom. The same may be for the section immediately under the thickening rib. Where there are tapers in the wall thickness, it is common to calculate the HSR using an average wall thickness by averaging the thickest and thinnest sections.

The bottle geometry is important in that an indentation where one would put a grip feature (to hold in one's hand)

is going to be a smaller diameter than the corresponding main bottle diameter. This is also the case with an inward contour feature. This changes the HSR. Please note the two tables below to see how the wall thickness is impacted by the HSR with and without the indented grip.

TABLE I

Wall thickness/Stretch Ratio to a Simple Cylinder

| Location on Preform (FIGS. 3A & 5) | Range of Preform Wall Thickness | Example: Wall Thickness Preform (in) | Example: Hoop Stretch Ratio (HSR) *(ranges) | Example: Resultant Bottle Wall Thickness** (in) |
|---|---|---|---|---|
| A = Typical Upper Body | $t_1$ | .150 | 5.0 | .0100 |
| B = Transition | | | | |
| C = Thickening Rib | (1.02 to 1.5) × $t_1$ | 1.2 × .150 = .180 | 5.1 | .0118 |
| D = Transition | | | | |
| E = Typical Lower Body | $t_2$ | .150 | 5.2 | .0097 |

*Assumes Axial Stretch Ratio (ASR) Constant at 3.0
**Wall thickness = preform wall thickness/(ASR × HSR)

TABLE 2

Wall Thickness/Stretch Ratio to an Indented Grip Feature or Contour Feature

| Location on Preform (FIGS. 3A & 5) | Range of Preform Wall Thickness | Example: Wall Thickness Preform (in) | Example: Hoop Stretch Ratio (HSR) *(ranges) | Example: Resultant Bottle Wall Thickness** (in) |
|---|---|---|---|---|
| A = Typical Upper Body | $t_1$ | .150 | 5.0 | .0100 |
| B = Transition | | | | |
| C = Thickening Rib | (1.02 to 1.5) × $t_1$ | 1.2 × .150 = .180 | 3.0 | .0200 |
| D = Transition | | | | |
| E = Typical Lower Body | $t_2$ | .150 | 5.2 | .0097 |

*Assumes Axial Stretch Ratio (ASR) Constant at 3.0
**Wall thickness = preform wall thickness/(ASR × HSR)

The only limitation to the % increase of the thickening rib is the allowable maximum wall thickness of the preform. There are limitations to the absolute maximum wall thickness for quenching and reheating thick sections. Theoretically, the % increase could be several hundred percent but the range noted in the tables is somewhat more practical.

If the "normal" preform (no thickened rib) was used on an indented grip or contour feature design as in Table 2, the resultant bottle wall would be only .0167 inch [.150/(3*3)]. The thickening rib thus yields a 20% increase in wall thickness (0.020 vs. 0.0167) for an indented grip design and an 18% (0.0118 vs. 0.010) increase with simple cylinder design.

By itself, the thickening rib will increase the wall thickness of the bottle. In conjunction with an indented grip or contour feature the thickening rib will result in even thicker walls (by percentage). The thickening rib allows thicker bottle wall in selected cross-sections of the bottle via preform design. This extra thickness minimized distortion that will take place on an indented feature of a bottle when pressure and temperature are applied.

For a two-liter carbonated, soft drink bottle, the typical wall thickness in the label panel area is approximately 0.010–0.012 inch. Table 3 shows results of typical and thick rib preforms and resultant bottle wall thickness on an indented grip design plus the total distortion after pressurization and elevated temperature.

TABLE 3

Comparison of Typical and Thick Rib Preforms Blown into Grip or Contour Feature Bottle

| Preform Vertical Location | Bottle Vertical Location | Preform Wall Thickness Typical Preform (in) | Preform Wall Thickness Thick Rib Preform (in) | Bottle Wall Thickness Typical Preform (in) | Bottle Wall Thickness Rib Preform (in) | Original Bottle Diameter (in) | Final Bottle Diameter Using Typical Preform (in) | Final Bottle Diameter Using Thick Rib Preform (in) | Original Bottle Heights (in) | Final Bottle Heights using Typical Preform (in) | Final Bottle Heights Using Thickened Preform (in) |
|---|---|---|---|---|---|---|---|---|---|---|---|
| upper body | upper body | 0.150 | 0.150 | 0.011 | 0.011 | 4.300 | 4.386 | 4.408 | 3.750 | 3.825 | 3.788 |
| thick rib | grip | 0.150 | 0.180 | 0.015 | 0.025 | 3.300 | 4.310 | 3.383 | 3.000 | 3.300 | 3.030 |

TABLE 3-continued

Comparison of Typical and Thick Rib Preforms Blown into Grip or Contour Feature Bottle

| Preform Vertical Location | Bottle Vertical Location | Preform Wall Thickness Typical Preform (in) | Preform Wall Thickness Thick Rib Preform (in) | Bottle Wall Thickness Typical Preform (in) | Bottle Wall Thickness Rib Preform (in) | Original Bottle Diameter (in) | Final Bottle Diameter Using Typical Preform (in) | Final Bottle Diameter Using Thick Rib Preform (in) | Original Bottle Heights (in) | Final Bottle Heights using Typical Preform (in) | Final Bottle Heights Using Thickened Preform (in) |
|---|---|---|---|---|---|---|---|---|---|---|---|
| lower body | lower body | 0.150 | 0.150 | 0.011 | 0.011 | 4.300 | 4.386 | 4.408 | 3.750 | 3.825 | 3.788 |

Figure 6:
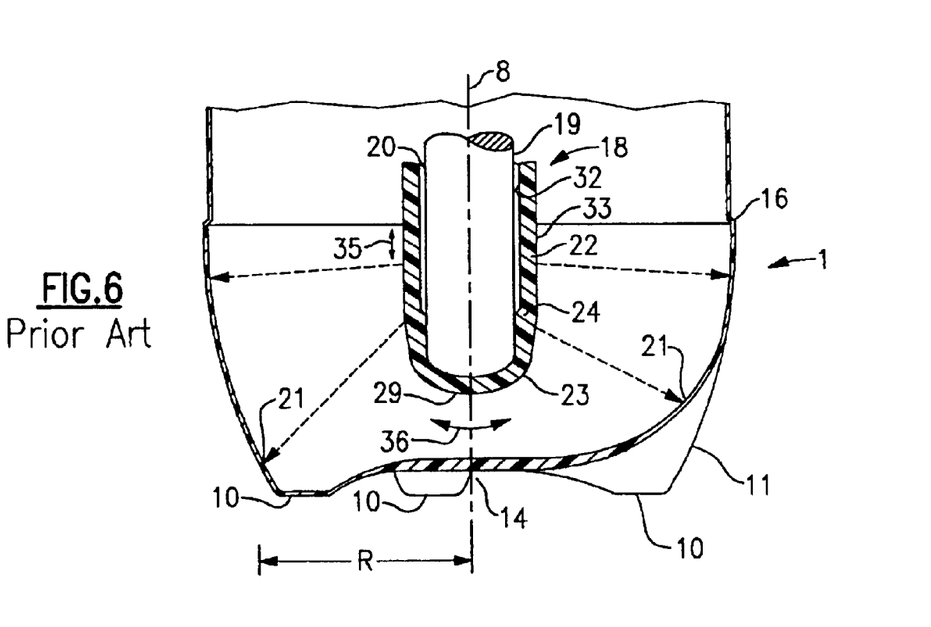
FIG. 6 is a prior art, cross-sectional elevation illustrating the material distribution of a preform having a base reinforcing ring in the blow molding of footed (petaloid) container for carbonated beverages.

Turning now to FIG. 6, there is shown the petaloid base of the prior art.

FIG. 6 shows, in cross-section, part of monobase preform 18. The preform 18, injection molded polyester, typically PET (polyethylene terephthalate), is temperature conditioned and placed in a blow mold over and longitudinally stretched by a stretch rod 19. Pressurized gas is applied within the annular space 20 between the preform 18 and stretch rod 19 to push the walls of the preform 18 outwardly away from the axis 8 so as to expand the preform 18 into a desired finished shape in the blow mold which defines the exterior of that shape.

The preform comprises a neck finish, connected to a neck transition portion by way of a neck support ring. A sidewall producing portion 20 of the preform extends from the neck transition portion. Both the inner walls 32 and outer walls 33 of the sidewall forming portion 22 are slightly tapered to facilitate release from the injection mold cavity and core. The sidewall forming portion 22 terminates in a closed base producing portion 23 having a wall thickness, in the gate producing area thereof, of 0.115 inch (2.921 mm). However, the transition (reinforcing ring forming portion 24) between the sidewall forming portion 22 and the bottom forming portion 23 has an increased wall thickness of about 0.155 inch (3.937 mm). The purpose of the reinforcing ring forming portion 24 will be described hereinafter.

Prior to blow molding the preform 18 to produce the bottle 1, the preform 18 is temperature conditioned with preform 18 being turned about axis 8, during conditioning, so as to receive uniform heat. This temperature conditioning takes place outside the blow mold cavity immediately prior to being positioned in the mold cavity. For simplicity, the neck producing portion (which remains substantially the same) and the mold itself are not shown. The stretch rod 19, being extendable along the longitudinal axis, is pushed downward stretching the preform longitudinally until the bottom 29 of the preform 18 is closely adjacent (but spaced from) the bottom of the cavity. The reinforcing ring forming portion 24 has a wall thickness greater than both the wall thickness of the sidewall forming portion 22 and the bottom forming portion 23 and therefor the reinforcing ring forming portion 24 has a greater mass per unit area and is slightly cooler than the thinner portions of the preform. Due to this and the greater thickness, more stretching occurs in the sidewall forming portion 22 and the gate area forming portion 23 than in the relatively cool thicker reinforcing ring forming portion 24. During blow molding, the stretch ratio between the wall thickness of the gate area forming portion 23 and the gate area 14 is about 2:1 whereas the stretch ratio between the sidewall forming portion 22 and the sloping wall 11 is about 12:1. In FIG. 6, the extension of the sidewall forming portion 22 by the stretch rod 19 occurs along axis 8 as shown by arrows 35 whereas arrows 36 show the direction of extension in the bottom forming portion 23 by the stretch rod. The inside diameter of the preform 18 is greater than the outside diameter of the stretch rod 19 whereby an annular space 20 is provided. This space 20 facilitates pressurization of the preform 18 to produce the bottle 1. Also, this space provides for a simply designed stretch rod having no step to accommodate the reinforcing ring forming portion 24 of the preform 18.

Pressurized gas is introduced within the preform 18 to blow the preform 18 outwardly and downwardly away from the stretch rod to produce the bottle 1. The gas is introduced so that blow molding proceeds from the top of the bottle 1 adjacent the neck transition to the bottom forming portion 23. The introduction of the gas may commence before the stretch rod has completed the longitudinal extension of the preform.

As is well known by those skilled in the art, preferred performance is obtained in PET containers by providing desired axial and hoop stretching of the material during the blow molding process thus bi-axially orienting the material of the container. The above described control of the temperature conditioning and the stretch rod operation coupled with the blow molding itself provide desired bi-axial orientation of the container material together with accurate placement of the reinforcing ring forming portion 24 and gate area forming portion 23 to form the reinforcing petaloid base of the container.

Finally, since the reinforcing ring forming portion 24 is cooler, material is pulled from bottom forming portion during blowing to increase the stretch and thus the orientation in the gate area 14. This is believed at least in part because as the sidewall forming portion 22 is blown outwardly away from the stretch rod 19, the gate area forming portion 23 is also blown outwardly and downwardly away from the stretch rod 19 while the slightly cooler more massive reinforcing ring forming portion 24 is laid into the pad forming portion of the mold last after the gate area has been formed. Thus, as ring area 24 is more resistant to expansion, the expansion of the reinforcing ring 24 has the tendency to draw material from gate area 23 and area 22 adjacent the reinforcing ring 24. Thus, the gate area forming portion 23 is able to expand across the gate area with greater freedom than is available in the absence of the reinforcing ring forming portion 24.

When the blowing is complete, container in the form of a bottle is produced having less weight than prior art petaloid based bottles while maintaining adequate strength to withstand internal pressure from a carbonated beverage.

The bottle illustrated includes a small annular lip 16, which is primarily present for aesthetic purposes and for label alignment during production. This lip lies adjacent the transition from the sidewall to the base.

Figure 7:
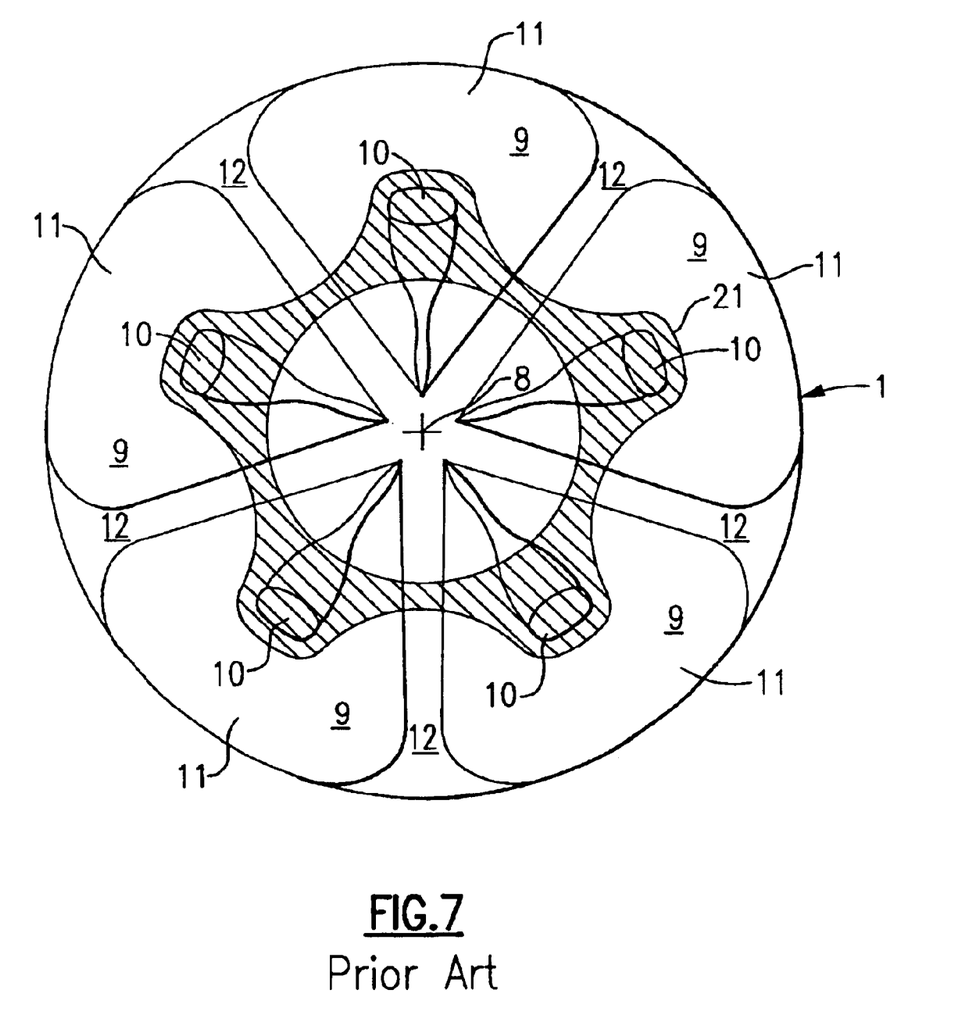
FIG. 7 is a prior art, diagrammatic underview of the container of FIG. 6 illustrating the distribution of the reinforcing ring material in the footed base.

Turning now to FIG. 7, there is shown the bottom view of the base of the present invention showing the reinforcing ring 21 extending circumferentially around the base and following the curves and slopes through the foot walls 9, foot pads 10, straps 12 and sloping walls 11.

Figure 8:
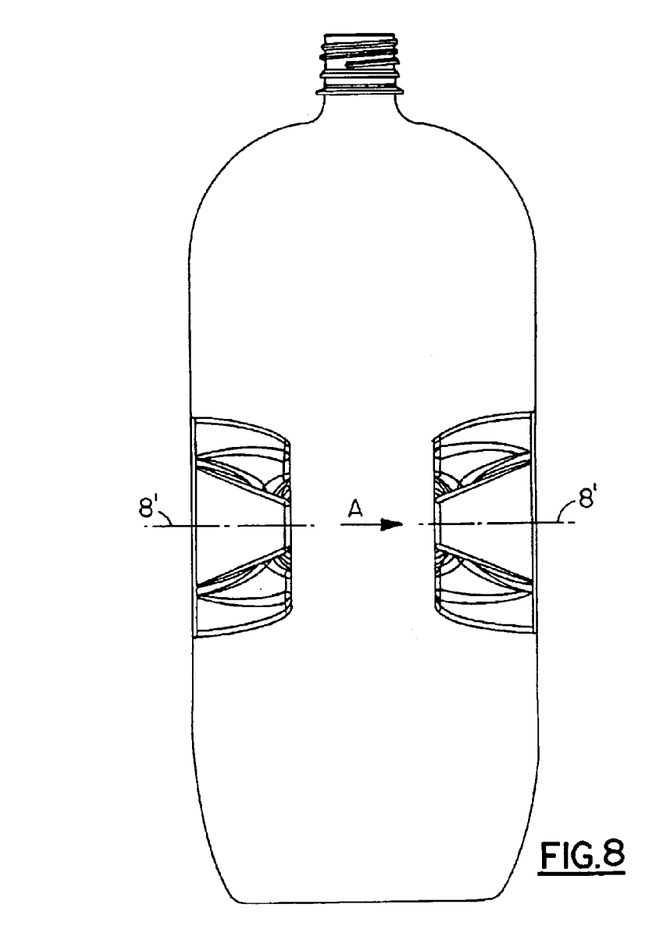
FIG. 8 is a diagrammatic cross-section of an embodiment of a container having hand grip features comprising an inverted petaloid design formed into opposed areas of the container sidewall.
Figure 9:
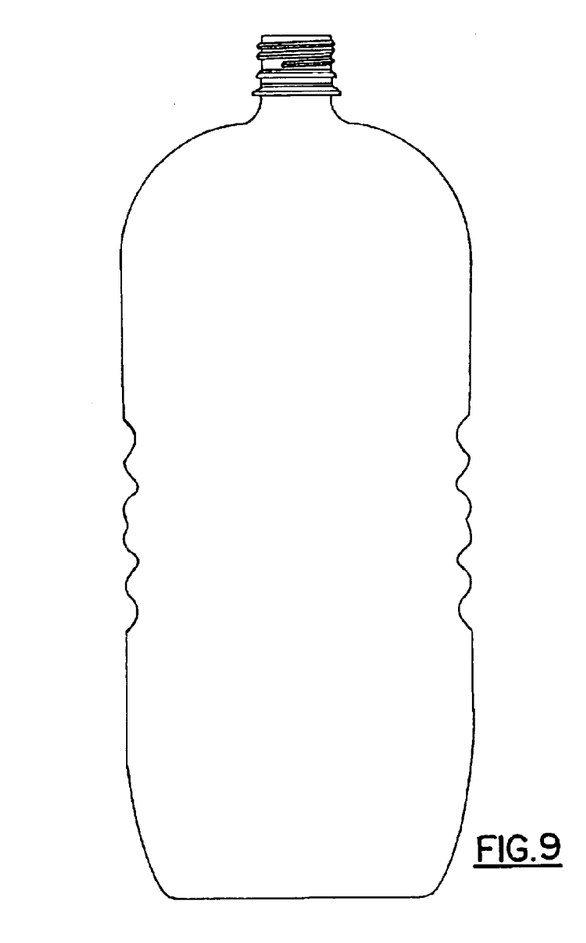
FIG. 9 illustrates the container of FIG. 8 shown in profile to show the hand grip features provided by the inverted petaloid design once the container is pressurized.
Figure 10:
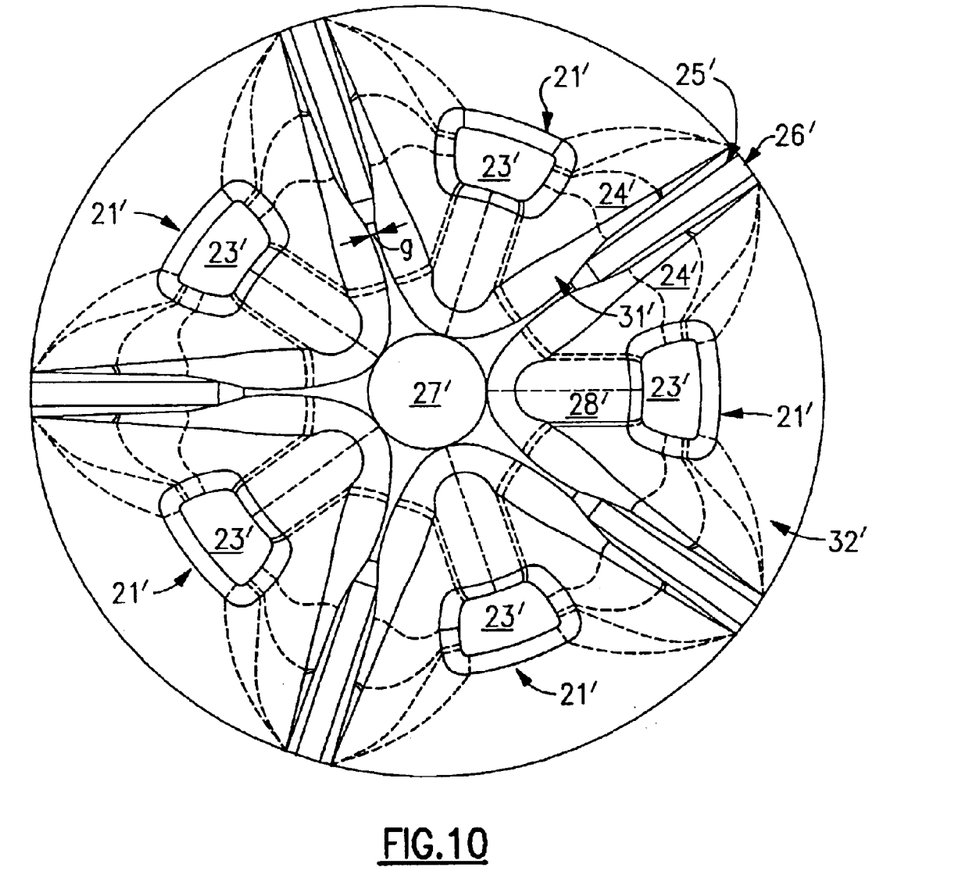
FIG. 10 is a view in the direction of arrow A in FIG. 8 illustrating the features of a typical inverted hand grip feature.

Referring now to FIGS. 8, 9, and 10, the hand grip features each comprise an intaglio feature in the form of five identical, hollow feet 21', which together form a petaloid foot formation with the feet symmetrically and evenly disposed about the longitudinal axis of the intaglio feature. The innermost extensions of the feet 21' terminate in "foot" pads 23'. The pads 23' together define a plane disposed normal to the axis 8' of the hand grip feature, this axis 8' passes through and extends normal to the longitudinal axis of the container. Each foot 21' comprises sloping sidewalls 24' extending from its pad 23'to adjacent straps 25' which generally conform to the underlying modified hemispherical form. The container of FIGS. 8, 9 and 10 may be made using the preform of FIG. 3.

The dashed lines in the feet 21' of FIG. 10 indicate the theoretical underlying intersections of the surfaces defining the feet and the modified hemispherical shaped base. These intersections are theoretical due to the joining of the surfaces by smooth transitions, fillets or chamfers in order to define the curvature of the surfaces concerned.

The radially extending straps 25' are disposed between adjacent pairs of feet 21'. These straps 25' each include flat strap, root portions 26' but otherwise substantially follow the surface curvature of the underlying modified hemispherical shape of the base. The straps 25' each terminate at and open into an extended portion and meet a sloping wall.

The base area 27' through which extends the axis is connected to each pad 23' by a ridge ankle 28' joined on either side by blending curves to portions of the sloping walls 24'.

Although shown by solid lines, for simplicity, at the junctions between the sloping sidewalls 24' and the straps 25' and pads 23', and between the ankles 28' and base area 27', the intersection of these elements are curved in cross-section to provide smooth transitions to and structural rigidity.

Although described in detail with reference to carbonated beverage containers, it will be appreciated that the present invention has application for use in non-pressurized containers which would otherwise yield due to gripping forces.

We claim:

1. A preform for blow molding container having a hand grip feature to facilitate handling of the container, the preform having a hollow interior for blow molding the container having a hand grip feature to facilitate handling of the container, the preform defining a longitudinal axis and comprising an integral structure, the hollow interior of which is snaped and sized to allow axial removal of the preform from a core of an injection mold in which the preform is molded, the preform having, in interconnected axial sequence, a container neck finish forming portion defining an opening to the hollow interior, an annular container shoulder forming portion, an annular container first wall forming portion, an annular container intermediate wall forming portion, an annular container second wall forming portion and a closed container base forming portion, wherein the annular intermediate wall forming portion has a wall thickness greater than the first and the second annular wall portions.

2. The preform according to claim 1, wherein the closed base forming portion defines an annular base reinforcing ring of a wall thickness greater than a wall thickness of the first and second wall forming portions and greater than a wall thickness of a remainder of the closed container base forming portion.

3. A blow molded container having a contour feature to facilitate handling of the container, the preform having a hollow interior for blow molding the container having the contour feature, the preform defining a longitudinal axis and comprising an integral structure, the hollow interior of which is shaped and sized to allow axial removal of the preform from a core of an injection mold in which the preform is molded, the preform having in interconnected axial sequence, a container neck finish forming portion defining an opening to the hollow interior, an annular container shoulder forming portion, an annular container first wall forming portion, an annular container intermediate wall forming portion, an annular container second wall forming portion and a closed container base forming portion, wherein the annular intermediate wall portion has a wall thickness greater than the first end the second annular wall portions, the blow molded container having, in interconnected axial sequence, a neck finish formed by the neck finish of the preform, a shoulder portion formed from the shoulder portion of the preform, first, intermediate and second wall portion formed from the first, intermediate and second wall portions of the preform and a closed base formed from the dosed base portion of the preform, the contour feature comprising an annular concavity in the intermediate wall portion of the preform, the annular concavity having a wall thickness greater than the wall thickness of the first and second wall portions of the blow molded container.

* * * * *